United States Patent
Kocdemir et al.

(10) Patent No.: US 11,983,915 B2
(45) Date of Patent: May 14, 2024

(54) CONTENT GENERATION SYSTEM AND METHOD

(71) Applicant: Sony Interactive Entertainment Inc., Tokyo (JP)

(72) Inventors: Sahin Serdar Kocdemir, Surbiton (GB); Oliver Richard Smith, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 242 days.

(21) Appl. No.: 17/459,192

(22) Filed: Aug. 27, 2021

(65) Prior Publication Data

US 2022/0076047 A1 Mar. 10, 2022

(30) Foreign Application Priority Data

Sep. 4, 2020 (GB) ...................................... 2013933

(51) Int. Cl.
*G06V 10/60* (2022.01)
*G06T 15/50* (2011.01)
*G06V 40/16* (2022.01)
*H04N 5/222* (2006.01)

(52) U.S. Cl.
CPC ............ *G06V 10/60* (2022.01); *G06T 15/506* (2013.01); *G06V 40/171* (2022.01); *H04N 5/2224* (2013.01)

(58) Field of Classification Search
CPC .... G06V 10/60; G06V 40/171; G06T 15/506; G06T 15/50; H04N 5/2224; A63F 13/56; A63F 13/655
See application file for complete search history.

(56) References Cited

U.S. PATENT DOCUMENTS

| | | | | |
|---|---|---|---|---|
| 10,860,838 B1* | 12/2020 | Elahie | .................... | A63F 13/655 |
| 11,222,221 B2* | 1/2022 | Ebihara | ................ | G06V 40/161 |
| 2008/0267600 A1* | 10/2008 | Omi | ...................... | G06V 40/166 396/14 |
| 2012/0069139 A1* | 3/2012 | Basso | .................... | H04N 7/147 348/14.16 |
| 2014/0327690 A1* | 11/2014 | McGuire | ............... | G06T 15/005 345/589 |
| 2015/0123967 A1* | 5/2015 | Quinn | ....................... | G06T 7/60 345/419 |

(Continued)

OTHER PUBLICATIONS

Virtual U: Defeating Face Liveness Detection by Building Virtual Models from Your Public Photos—2016 (Year: 2016).*

(Continued)

*Primary Examiner* — Nizar N Sivji
(74) *Attorney, Agent, or Firm* — Matthew B. Dernier, Esq.

(57) ABSTRACT

A system for generating one or more images for display, the system comprising an image obtaining unit operable to obtain an image of a user's face, a geometry information unit operable to identify geometry information for the user's face using the obtained image, a lighting information unit operable to obtain lighting information for a virtual environment, a representation generation unit operable to generate a representation of the user's face generated using the obtained lighting information, and an image output unit operable to generate an output image comprising the generated representation and an image of the virtual environment.

14 Claims, 3 Drawing Sheets

(56) References Cited

U.S. PATENT DOCUMENTS

| | | |
|---|---|---|
| 2015/0279113 A1 | 10/2015 | Knorr |
| 2018/0107864 A1* | 4/2018 | Meekins ................. A63F 13/35 |
| 2019/0266774 A1* | 8/2019 | Sommerlade ........... A63F 13/86 |
| 2020/0250799 A1* | 8/2020 | Nakada ................... G06T 5/008 |
| 2020/0286284 A1* | 9/2020 | Grabli .................... G06T 13/40 |
| 2021/0192243 A1* | 6/2021 | Lin ....................... G06V 10/145 |
| 2022/0375258 A1* | 11/2022 | Hua ..................... G06V 40/171 |

OTHER PUBLICATIONS

Combined Search Report and Examination Report for corresponding GB Application No. 2013933.3, 10 pages, dated May 19, 2021.
Anders Wang Kristensen, et al., "Precomputed Local Radiance Transfer for real-time Lightening Design" ACM Siggraph conderence Proceedings, 8 pages, dated Jan. 7, 2005.

* cited by examiner

CONTENT GENERATION SYSTEM AND METHOD

BACKGROUND OF THE INVENTION

Field of the Invention

This disclosure relates to a content generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Picture-in-picture (PiP) displays have been used in a number of arrangements in recent years, with a particular increase in use in the field of gaming. PiP arrangements are those in which a small image or video (secondary content) is presented in an overlaid manner in conjunction with a display of larger (often full-screen) primary content. Exemplary uses include camera feeds (such as security cameras or baby monitors) that are overlaid on primary content such as movies and television shows, rather than being limited only to gaming arrangements as described below.

In gaming, this finds frequent use in a streaming context. Streaming refers to the process of transmitting video of a user's gameplay to one or more spectators, in some cases via a third-party website. When streaming it is common for the player to overlay images or videos showing their face and/or body upon the gameplay; this content is often derived from a webcam or the like directed towards the player.

The display of this overlaid content may be considered advantageous as it can improve viewer engagement and assist a player in obtaining a greater number of viewers; however there are numerous drawbacks associated with this display.

A first negative impact that may be observed is that of the covering or obscuring of one or more user interface (UI) elements. While this may not cause issues for the player themselves, as the content is usually not displayed to the player, this may disrupt the viewing of a user and prevent a full understanding of the gameplay from being obtained. For instance, in a driving game the viewer may not be able to fully appreciate the gameplay if the driving speed or map is obscured.

Another example of a possible negative impact that is derived from this display is that of a disruption of the immersion of the viewer. Often the content that is displayed includes significant sections of the player's real-world environment (such as their bedroom), which is generally not in keeping with the virtual environment being explored in the game. When displayed together, the fact that the player's surroundings can be seen detracts from the viewing of the virtual environment.

While in some cases the use of a green screen or other arrangements to enable a simplified removal of the background (such that the secondary content includes only the player) may be considered adequate to address the above issues, in a number of cases it is considered that improvements may still be made to the display of this content.

It is in the context of the above considerations that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
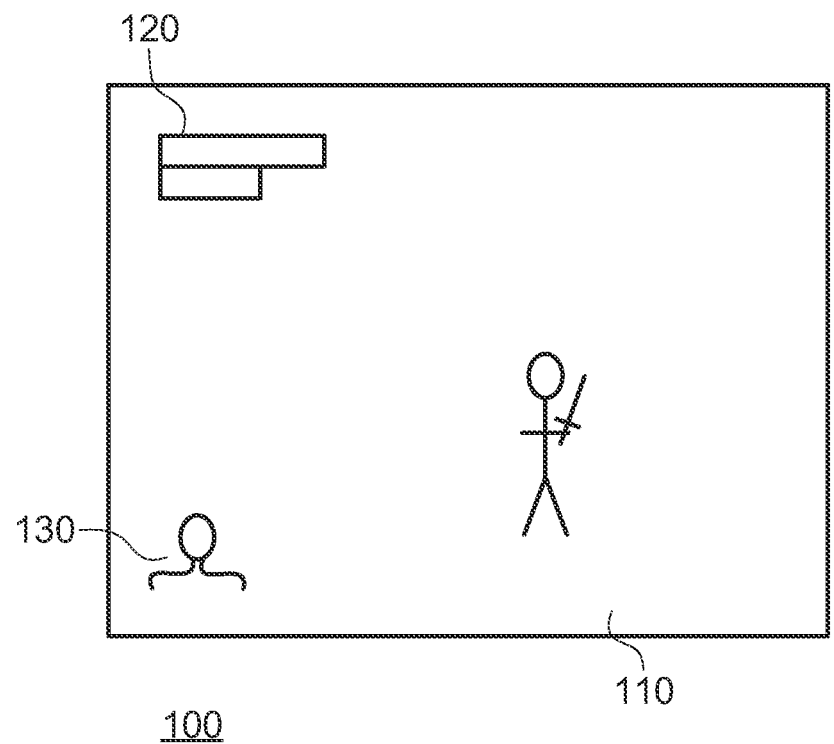
FIG. 1 schematically illustrates a picture-in-picture display.

Referring now to the drawings, wherein like reference numerals designate identical or corresponding parts throughout the several views, embodiments of the present disclosure are described.

FIG. 1 schematically illustrates an example of the display of PiP content in which a player is overlaid upon a video of game content. As noted above, such embodiments should not be considered limiting; a number of different PiP scenarios may be considered suitable for applications of the presently disclosed arrangement.

In FIG. 1, the display 100 comprises a player-controlled character 110, a UI element 120, and an image of the player 130. In this example, the image of the player 130 is considered to be the secondary content while the rest of the display is considered to be the primary content. The location of the image of the player 130 may be determined by the player themselves, or using any other suitable method; in general, a location is determined so as to cause minimum interference with the gameplay and one or more UI elements. Of course, this is not always possible and in some cases lower-priority UI elements may be selected to be obscured by the image of the player 130.

As shown in FIG. 1, the image of the player 130 has been processed so as to not display the background within the image—that is, only the player 130 is shown and not their surroundings. This may be achieved using any suitable segmentation process; a common example is that of providing a uniform background within the images captured of the user (such as a green screen), with the use of the uniform background aiding in identifying the non-player regions of the image.

Embodiments of the present disclosure, as noted above, are directed towards systems and methods for generating an improved display in line with FIG. 1. More specifically, the systems and methods described in this document seek to improve the display of the image of the player by performing a relighting process that enables a display that more closely relates to the primary content (such as an in-game environment). This may be advantageous in that a more immersive viewing experience is provided, as the player's face will appear more natural against the backdrop of the primary content. In addition to this, the viewing experience of a viewer may be improved as anomalous variations in display brightness may be reduced (such as a player sitting in a bright room, while their avatar is in a dark room).

The advantages of embodiments of the present disclosure are further apparent in view of the alternative solutions that could be considered. For example, in some cases a modification of the lighting may be performed using hardware elements (such as lights in the user's physical environment). Such an arrangement may result in increased expense and energy use, as well as limited performance compared to the arrangements discussed presently.

Figure 2:
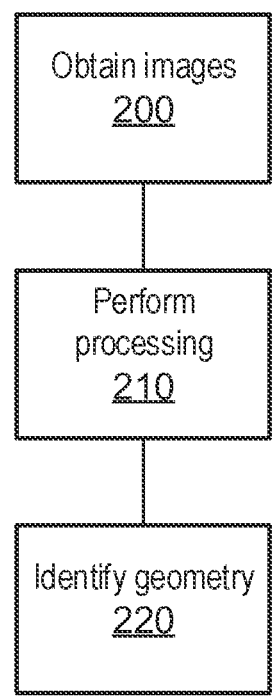
FIG. 2 schematically illustrates an information capture method.
Figure 3:
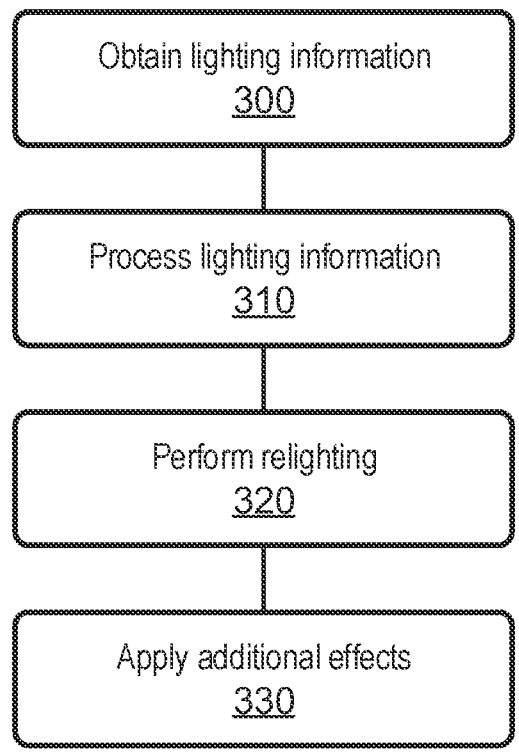
FIG. 3 schematically illustrates a modification generation method.
Figure 4:
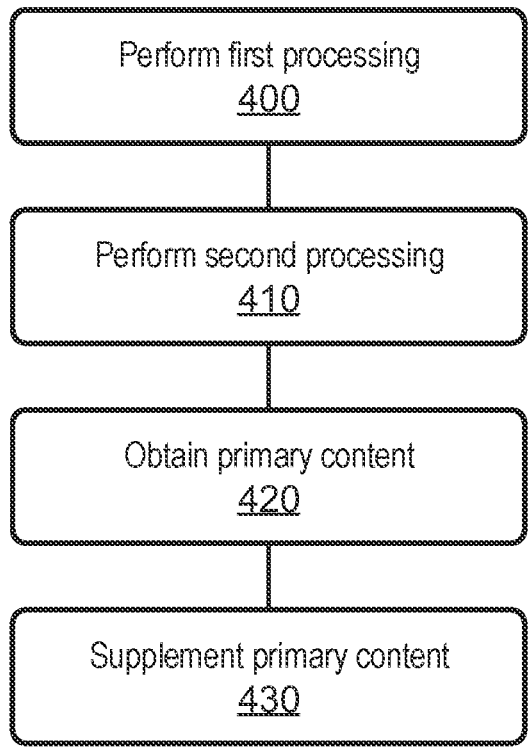
FIG. 4 schematically illustrates a content generation method.

FIGS. 2, 3, and 4 schematically illustrate an exemplary method of generating content for display in the desired manner. A number of variations or modifications to the disclosed process are envisaged, of which several are discussed below, and as such this exemplary method should not be considered limiting.

The described method may be carried out entirely at a local processing device, such as a personal computer or games console, or information may be transmitted to an external processing device or server (such as a cloud computing arrangement or a server operated by a video streaming service) to enable the processing to be performed remotely. Of course, in some embodiments different steps may be performed by different devices in one or more locations in a distributed manner.

FIG. 2 illustrates a method that relates to the imaging of the player, and the generation of suitable parameters and/or representations for use in generating the final content.

At a step 200, images of the player are obtained. In some embodiments, this may comprise the capturing of the images by a camera associated with a device used to generate the final content or a device used to play the game; however, it is also considered that the images may be obtained indirectly. For instance, in the case that a server performs the processing the images may be obtained from a processing device that transmits the images to the server. This is therefore an example of performing the process without requiring the capturing of the image content to be performed. Similarly, the image content may be pre-recorded and stored for later use—and as such there may be a significant decoupling of the image capture and image obtaining process.

While references are made throughout the specification to the user's head, these should be interpreted in a broader manner so as to include the shoulders (for example) or any other body part that is present within the image. This is considered appropriate in that the relighting process is to be applied to each of the parts of the image corresponding to a user, and not just the head, so as to avoid a mismatch in lighting conditions throughout the image. Of course, in some cases the obtained images may be cropped to remove the additional body parts and in these cases the process would instead be expected to focus on the parts of the user that are to be used in the final image.

At a step 210, one or more processing steps are performed to obtain information from the captured images that are obtained in step 200. Any suitable processing may be performed in this step, in any appropriate order; a selection of exemplary processing options is provided below. Any processing which aids in extracting information from captured images, or improving the image for future use, may be considered appropriate.

One such process that may be performed is that of removing the background behind a user. This can be performed in any suitable manner. In some examples, this may be performed using depth information from the image to determine which elements are in the foreground (which would be expected to correspond to the user) and which are in the background (which would be expected to correspond to non-user features). Alternatively, or in addition, a colour analysis may be performed to identify user and non-user elements; this may be assisted by use of a uniformly coloured background, as noted above. As a further alternative or additional process, motion information between successive image frames may be used to identify the user; it is considered that the background would be static, and that the dynamic elements correspond to the user (and/or one or more objects of interest).

In some embodiments, a correction or modification to the lighting in the image may be performed. This may be suitable for preparing the image for further processing to enable more (or more reliable) information to be derived from the image, as well as generating an image that may be more appropriate for generating an image for display. For instance, processing may be performed that removes harsh lighting from the image—an example of this is the changing of values of pixels with an above-threshold brightness.

In some embodiments, a detection of the albedo within the captured image is performed. This may be useful in that it represents the reflectiveness of a surface, and so this information may be used to generate an image that appears more realistic when applying relighting or other image modifications. This may be achieved using any suitable image processing techniques, and may be supplemented with information about lighting present within the user's environment or the like.

In some embodiments, a facial recognition process may be performed. While this may comprise an identification of the user, in many cases this is performed so as to identify one or more facial features (such as eyes or nose) in the captured images. This can assist in generating an accurate representation of the user's face, as well as interpreting the other information that is derived (for example, information about the size/position of the nose can be used to constrain shadow positions).

The facial recognition information may also be utilised in an orientation tracking process; of course, other orientation tracking processes may be considered appropriate in a number of embodiments. One such example is that of a user wearing a marker or other indicator of face location/orientation that can be tracked with a camera, or wearing one or more inertial sensors. However the tracking is performed, it may be advantageous to be able to identify the orientation of the user's face as this can assist with characterising the image and the light (or other parameters) within the image.

At a step 220, geometry information representing the user's head is identified. In some embodiments, the above information (that is, information derived in step 210) can be used to generate a model of the user's head and/or body, and a corresponding normal map. This may be an effective way of capturing the generated information and utilising it for further processing. The model of the user's head comprises geometric information (such as a face size and shape), while the normal map comprises more detailed surface information.

The model of the user's head may be generated based only on the captured images (which may be particularly appropriate when depth information is captured with the images), or may be generated by deforming an existing model that effectively acts as a template. In the latter case, this may result in a reduction in the amount of processing that is required. In either case, the model may be generated based upon a plurality of captured images, rather than a single image, with the model being updated in a dynamic manner as more information is captured.

The output from step 220 may be determined as appropriate, with the purpose of this method being the generation of information that can be used as part of a relighting process for the captured images (or representations of those images). Therefore any output that comprises sufficient geometric information and the like to enable such a process is considered appropriate.

In addition to the purely geometric information (such as surface normals), material information about that geometry may also be derived. This may comprise one or more properties of the surface (such as reflectance or scattering coefficients), and/or an identification of the material itself (such as skin, hair, or textile). By obtaining this additional information, a more realistic and accurate relighting of the image may be performed.

FIG. 3 relates to the generation of lighting data that is to be used for the generation of the final content, and the application of that data to an image or representation generated in accordance with FIG. 2.

At a step 300, lighting information about the virtual environment that is being displayed is obtained. For example, this may comprise the extraction of information about lighting within a game environment or information about light sources within video content or the like. Such information may be captured in any of a number of suitable manners, as appropriate for the particular embodiment. This lighting information should comprise one or more details enabling the reconstruction of lighting in the environment; examples of suitable information includes that relating to the location of light sources, the intensity and/or colour of light at different locations, and/or the presence of reflective surfaces within the virtual environment.

In a first example, lighting is captured by using a radiance or irradiance probe. These are effectively samples of lighting within a scene that are taken from a number of different virtual locations. These can then be used to derive more comprehensive information about the lighting within the scene as appropriate, for example by using a number of probes and performing an interpolation process to derive information about the locations between the probes. When used in the context of games, it is noted that some rendering engines may include probes (or other cached lighting data that can be used in the same manner).

Another method that could be used in addition (or instead) is that of rendering a cubemap at a particular position within the virtual environment, and performing a diffuse convolution process so as to generate an irradiance map. This map can be sampled to evaluate the lighting environment within the virtual environment at one or more locations. In some examples, this cubemap may be rendered at the location of the player (or an adjacent position) as this may be particularly appropriate for generating lighting information in this particular area. Of course, it is considered that more than one cubemap may be used where appropriate; examples include those in which a higher level of precision or accuracy are desired, or those in which multiple players are present (such that a cubemap is rendered for each player).

At a step 310, the obtained lighting information is compressed (or otherwise modified) into a format which is to be used for further processing. Examples of suitable formats include the use of spherical harmonics or spherical Gaussians. Of course, in some embodiments this step may be omitted; while the reformatting and/or compressing may streamline future processing, it is not considered to be essential for the performing of this method.

At a step 320, the lighting information is used to apply a relighting to images captured of the user's face, or to a model representing the user's face. This step 320 may be performed using any of the data generated by the method of FIG. 2, as well as any other information as appropriate. In some cases, lighting is applied to the user's face (or the model) so as to simulate the face being at the position (and/or orientation) of their avatar in the virtual environment; however, any other location may also be considered appropriate—in some embodiments it may be considered more appropriate to simulate the face being at the position in the virtual environment that corresponds to the display location of the face. Whichever location is determined to be appropriate, the processing here is performed so as to generate a different apparent lighting to that which is experienced by the user in their real-world environment.

This relighting process may be performed in any suitable manner; in some examples, the albedo and normal information derived in the method of FIG. 2 may be used with the lighting information to render a new image in the same manner as would be performed in a game or other computer-aided image generation process. Further examples of processes that may be performed include the modifying of colour values of individual pixels or image portions, or the application of a brightness function to an image that varies values in accordance with an expected lighting distribution (such as lighting and darkening parts of the user's face to correspond to lit and shaded portions).

At a step 330, one or more other effects may be applied to the user's face (or the model representing the user's face). Such effects may be user-defined (such as the application of cosmetic items, such as hats or make-up), or may be related to the content being displayed. For example, one or more virtual wounds may be applied to the image of the user's face after an in-game battle. In some cases, these effects may be used to convey game information and thereby enable one or more UI elements to be omitted from the display.

For example, the image of the user's face may be supplemented with an accessory similar to a wind sock to communicate information about speed in a racing game, a hat with a digital display may be provided, and/or one or more visual effects (such as the wounds described above, or a crown) may be applied to correspond to in-game parameters such as hit points or victories/achievements. Another example is that of providing a virtual light source; while this may cause a deviation between the lighting in the virtual environment and the lighting in the generated image of the user's face, this may be advantageous in particularly dark virtual environments or the like so as to ensure that the face can be seen.

FIG. 4 illustrates a method which comprises the steps discussed above with reference to FIGS. 2 and 3, and includes additional steps relating to the generation of the final content for display to one or more viewers.

A step 400 comprises a first processing operation in accordance with the method of FIG. 2; that is to say that a process is performed which generates at least geometry information from an input image of a player.

A step 410 comprises a second processing operation in accordance with the method of FIG. 3; that is to say that processing is performed that causes the generation of an image of the player with a modified lighting.

At a step 420, the primary content itself is obtained or otherwise accessed. In some embodiments, as noted above, this is gameplay video relating to a game that is being played by the player; alternative content includes that of any suitable video content or interaction with a virtual environment. In some cases, this may be the content that is displayed on-screen to the user/player of whom the images are captured and as such the content may be obtained via a screen recording program or the like. In other cases, the content may be being hosted remotely (such as in a cloud computing embodiment), and this step comprises accessing the content for further processing before distribution to viewers. In these embodiments, it is not necessary to obtain the content as such as long as the location of the content can be identified.

In general, it is considered that this step is distinct from the steps in FIG. 3 which relate to the identification of the lighting information within the primary content; the step 420 relates to the actual video content rather than the specifics of lighting and geometry within the virtual environment represented by the video content. Of course, this does not preclude these steps from being performed in combination or otherwise simultaneously.

At a step 430, the video obtained/accessed in step 420 is supplemented with the content generated in step 410. That is to say that the primary content is processed so as to overlay the modified image of the user's face (or model of the user's face). This may be performed using any suitable method, and may be automated (such that the positioning of the face is determined by a computer program or one or more predetermined settings) or may be user-controlled as appropriate. Such processing may be performed locally or remotely as appropriate; for example, a local device may combine the content before outputting it to viewers or a video hosting service. Alternatively, one or both of the content may be provided to a server to perform the combining; in some cases, the entire process is performed remotely.

Of course, these steps may be performed substantially simultaneously (or in an overlapping fashion), and in any suitable order. For instance, the step 420 may be performed prior to the other steps such that the process begins with obtaining the primary content.

Figure 5:
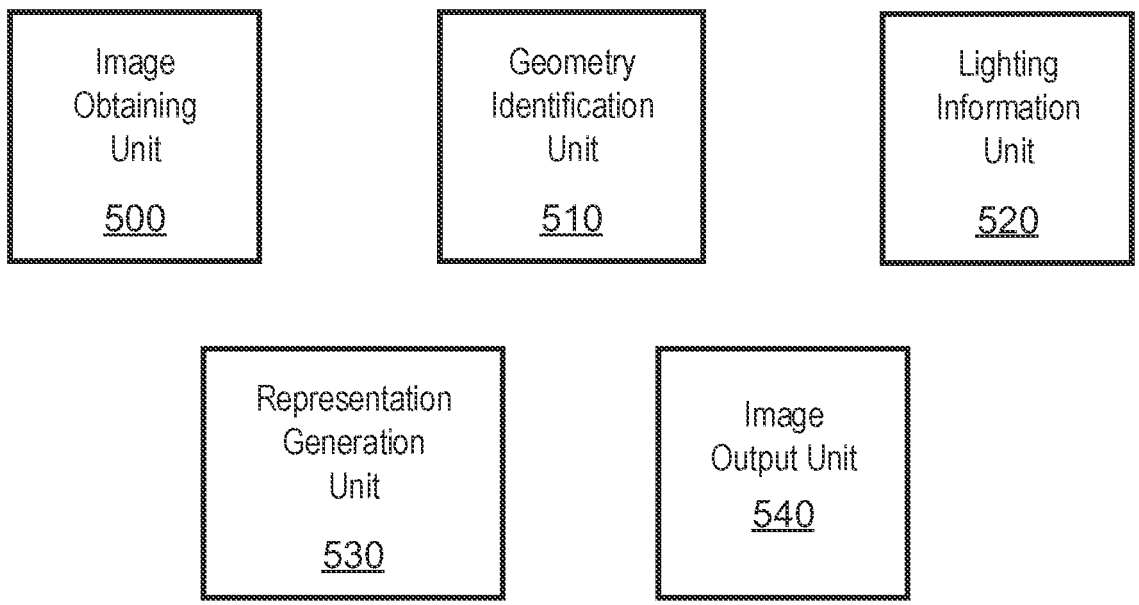
FIG. 5 schematically illustrates an image generation system.

FIG. 5 schematically illustrates a system for generating one or more images for display. The system comprises an image obtaining unit 500, a geometry identification unit 510, a lighting information unit 520, a representation generation unit 530, and an image output unit 540. As is clear from the above discussion, these units may be associated with a single processing device (such as a games console) or the units may be distributed between two or more processing devices (including a remote server) as appropriate for implementing the image generation process.

The image obtaining unit 500 is operable to obtain an image of a user's face. In some embodiments this may comprise the reception of images from a client at a server, for example, rather than directly obtaining images from a camera that is arranged to capture images of the user. It is also considered that in some embodiments a different device entirely may be responsible for capturing images of the user, such as a mobile phone, and therefore the images from the camera cannot be directly obtained by a console and/or server that are configured to perform additional method steps.

In a number of embodiments, the image obtaining unit 500 is operable to perform one or more additional processes to prepare the obtained image for further processing, the additional processes comprising at least removing a background from the image. Further exemplary processes may include the removal of harsh lighting, a brightening of the image to assist with additional processing, a change in resolution of the image, and/or a cropping (and/or otherwise resizing) the image.

The geometry identification unit 510 is operable to identify geometry information for the user's face using the obtained image. This is discussed above with reference to step 220 of FIG. 2, and may include any process that identifies one or more features within the captured image that relate to surfaces and/or shapes in the image. In some embodiments, the geometry identification unit 510 is operable to perform a facial recognition process; this may be used to aid mapping of the detected geometry to a model, tracking of the orientation of the user's face, and/or the accessing of pre-existing geometry information. It is also considered that the geometry identification unit 510 is operable to identify material information from the images, which can be useful for determining reflectivity and scattering properties for the identified geometry.

The lighting information unit 520 is operable to obtain lighting information for a virtual environment. This may be performed in any suitable manner with the purpose of obtaining information that enables a simulation of the lighting within the virtual environment; this simulation is generated so as to be able to recreate the lighting for an image or representation of the user's face.

In some embodiments, the lighting information unit 520 is operable to utilise one or more radiance or irradiance probes to obtain lighting information. In these embodiments, samples of the radiance or irradiance within the virtual environment may be taken at one or more virtual locations. These samples can then be used as a part of an interpolation process to derive lighting information for a range of different locations within the virtual environment.

Alternatively, or in addition, the lighting information unit 520 is operable to generate a cubemap at each of one or more locations within the virtual environment for the purpose of obtaining lighting information. These one or more locations may include the location of an avatar associated with the user within the virtual environment, for example. As discussed with the radiance or irradiance probes above, the lighting information unit 520 may be operable to obtain lighting information for one or more locations within the virtual environment and to perform an interpolation process to identify lighting information for one or more additional locations. This applies when using radiance or irradiance probes, cubemaps, and/or any other lighting information sampling process.

In addition to the above processes, the lighting identification unit 520 may further be operable to generate a compressed representation of the obtained lighting information. As noted above, this may take any suitable format; spherical harmonics or spherical Gaussians are considered to be two suitable examples.

The representation generation unit 530 is operable to generate a representation of the user's face generated using the obtained lighting information. In general this representation comprises a modified image based upon a captured image of the user's face, with the modification being determined based upon lighting information and the like to generate a desired relighting of the user's face within the image. However, in some embodiments it may be appropriate that the representation generation unit 530 is operable to generate a model of the user's face, and to use this to generate the representation.

As noted above, this relighting can use the lighting information for the virtual environment to identify an appropriate transformation to apply to the image of the user's face on a pixel-by-pixel basis. This can be performed using information such as the albedo and generated normal map, or any other information identified for the user's face or the captured images. In some embodiments, this can be performed using a compute shader such that the pixel values are modified for the render target in accordance with the calculated relighting values.

Alternatively, or in addition, the image of the user's face (or a model representing the user's face) may be imported into a rendering application (such as a game); this application may be the source of the virtual environment, in some instances, although it may instead be an unrelated application. In examples in which an application is the source of the virtual environment and is configured to perform the relighting, it is considered advantageous in the lighting information need not be processed to the same degree and may not need to be transferred.

In some embodiments, machine learning may be used to generate more detailed information relating to the geometry and/or other aspects of the captured images. For instance, the generation of surface normals and identification of materials may be enhanced using such processes; in addition to this, machine learning based shading functions may also be more robust than more traditional equivalents. By identifying more detailed information (in particular for skin, hair, and textiles), complex surfaces may be modelled more accurately and therefore a more realistic relighting may be performed.

In some embodiments, the representation generation unit 530 is operable to apply one or more virtual elements to the generated representation. These may be purely cosmetic (such as hats, wigs, or sunglasses); however it is also considered that the virtual elements may be used to represent one or more parameters or aspects associated with the virtual environment. Examples of these parameters or aspects include hit points of an avatar, in-game success (or failure), and a temperature or mood associated with the virtual environment (such as applying a frost effect or inserting a display showing a 'fear rating'). In some cases, the virtual elements comprise one or more virtual light sources; these may match those shown in the virtual environment (such as if the avatar has a light in their immediate vicinity), or may be used to generate a more favourable lighting than would otherwise be achieved (for example, to avoid the image of the user becoming too dark).

The image output unit 540 is operable to generate an output image comprising the generated representation and an image of the virtual environment. That is to say that the output image comprises a relit image of at least the user's face (or a model of the face) that is overlaid upon content such as a video game or a video. The specific arrangement of the elements within this image may be determined freely; however it is considered that it may be preferred to avoid overlaying the representation upon one or more UI elements within the image of the virtual environment. In some embodiments, the image of the virtual environment may be modified so as to omit one or more UI elements in the case that the information conveyed by a UI element is instead conveyed by a virtual element within the representation.

The generated output image may be stored for viewing at a later time (for example, as a part of a video stream to be uploaded or distributed at a predetermined time), and/or may be directly output to a server or the like to enable immediate viewing. In some embodiments, the output image may be generated for immediate display locally in addition to (or instead of) these other options.

The arrangement of FIG. 5 is an example of a processor (for example, a GPU and/or CPU located in a games console, server, or any other computing device) that is operable to generate one or more images for display, and in particular is operable to:

obtain an image of a user's face;
    identify geometry information for the user's face using the obtained image;
    obtain lighting information for a virtual environment;
    generate a representation of the user's face generated using the obtained lighting information; and
    generate an output image comprising the generated representation and an image of the virtual environment It should be appreciated here that reference to 'a' processor should not be interpreted as meaning that the process can only be performed by a single processing unit. Instead, it should be considered that any suitable arrangement of processors and/or devices may be suitable to implement the described method in combination with one another.

Figure 6:
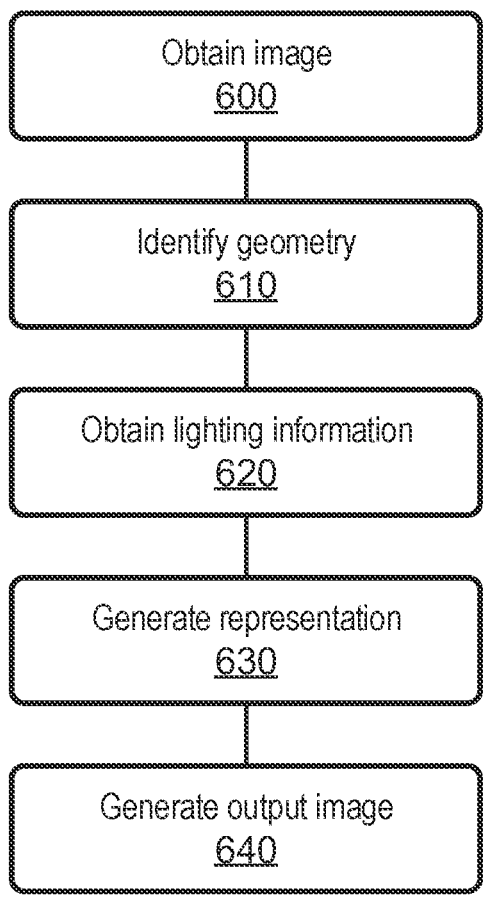
FIG. 6 schematically illustrates an image generation method.

FIG. 6 schematically illustrates a method for generating one or more images for display in accordance with the embodiments described above.

A step 600 comprises obtaining an image of a user's face. As noted above, this may include obtaining images from any suitable source including from a camera, a device comprising a camera, or from a data storage device.

A step 610 comprises identifying geometry information for the user's face using the obtained image. This geometry may include one or more of surface information, surface normal information, and/or other physical properties of the user's head.

A step 620 comprises obtaining lighting information for a virtual environment. This may comprise the use of any suitable radiance or irradiance probes, cubemaps, rendering engine data caches, or indeed any other source of information. Further processing may also be performed so as to convert the lighting information to a preferred format.

A step 630 comprises generating a representation of the user's face generated using the obtained lighting information. This may comprise modifying obtained images or generating a model of the user's face; these modifications may comprise relighting, the addition of virtual elements, and/or the application of virtual effects.

A step 640 comprises generating an output image comprising the generated representation and an image of the virtual environment. In general, this output image is generated by overlaying the generated representation upon the image of the virtual environment.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A system for generating one or more images for display, the system comprising:
    an image obtaining unit operable to obtain an image of a user's face;
    a geometry identification unit operable to identify geometry information for the user's face using the obtained image;
    a lighting information unit operable to obtain lighting information for a virtual environment;
    a representation generation unit operable to generate a representation of the user's face using the obtained lighting information; and
    an image output unit operable to generate an output image comprising the generated representation and an image of the virtual environment.

2. A system according to clause 1, wherein the representation generation unit is operable to apply one or more virtual elements to the generated representation.

3. A system according to clause 2, wherein the virtual elements are used to represent one or more parameters or aspects associated with the virtual environment.

4. A system according to clause 2 or 3, wherein the virtual elements comprise one or more virtual light sources.

5. A system according to any preceding clause, wherein the geometry identification unit is operable to perform a facial recognition process.

6. A system according to any preceding clause, wherein the lighting information unit is operable to utilise one or more radiance or irradiance probes to obtain lighting information.

7. A system according to any preceding clause, wherein the lighting information unit is operable to generate a cubemap at each of one or more locations within the virtual environment for the purpose of obtaining lighting information.

8. A system according to clause 7, wherein the one or more locations includes the location of an avatar associated with the user within the virtual environment.

9. A system according to any preceding clause, wherein the lighting information unit is operable to obtain lighting information for one or more locations within the virtual environment and to perform an interpolation process to identify lighting information for one or more additional locations.

10. A system according to any preceding clause, wherein the image obtaining unit is operable to perform one or more additional processes to prepare the obtained image for further processing, the additional processes comprising at least removing a background from the image.

11. A system according to any preceding clause, wherein the lighting identification unit is operable to generate a compressed representation of the obtained lighting information.

12. A system according to clause 1, wherein the representation generation unit is operable to generate a model of the user's face, and to use this to generate the representation.

13. A method for generating one or more images for display, the method comprising:
    obtaining an image of a user's face;
    identifying geometry information for the user's face using the obtained image;
    obtaining lighting information for a virtual environment;
    generating a representation of the user's face using the obtained lighting information; and
    generating an output image comprising the generated representation and an image of the virtual environment.

14. Computer software which, when executed by a computer, causes the computer to carry out the method of clause 13.

15. A non-transitory machine-readable storage medium which stores computer software according to clause 14.

The invention claimed is:

1. A system for generating one or more images for display, the system comprising:
    an image obtaining unit operable to obtain an image of a user's face while the user is engaged interactively with an application being executed to generate a virtual environment;
    a geometry identification unit operable to identify geometry information for the user's face using the obtained image;
    a lighting information unit operable to obtain lighting information for the virtual environment;
    a representation generation unit operable to generate a representation of the user's face using the geometry information for the user's face and the obtained lighting information; and
    an image output unit operable to generate an output image comprising the generated representation of the user's face and an image of the virtual environment,
    wherein the generated representation is overlaid upon the image of the virtual environment at a predetermined location in the output image selected by the user.

2. The system of claim 1, wherein the representation generation unit is operable to apply one or more virtual elements to the generated representation.

3. The system of claim 2, wherein the virtual elements are used to represent one or more parameters or aspects associated with the virtual environment.

4. The system of claim 2, wherein the virtual elements comprise one or more virtual light sources.

5. The system of claim 1, wherein the geometry identification unit is operable to perform a facial recognition process.

6. The system of claim 1, wherein the lighting information unit is operable to utilise one or more radiance or irradiance probes to obtain lighting information.

7. The system of claim 1, wherein the lighting information unit is operable to generate a cubemap at each of one or more locations within the virtual environment for the purpose of obtaining lighting information.

8. The system of claim 7, wherein the one or more locations includes the location of an avatar associated with the user within the virtual environment.

9. The system of claim 1, wherein the lighting information unit is operable to obtain lighting information for one or more locations within the virtual environment and to perform an interpolation process to identify lighting information for one or more additional locations.

10. The system of claim 1, wherein the image obtaining unit is operable to perform one or more additional processes to prepare the obtained image for further processing, the additional processes comprising at least removing a background from the image.

11. The system of claim 1, wherein the lighting information unit is operable to generate a compressed representation of the obtained lighting information.

12. The system of claim 1, wherein the representation generation unit is operable to generate a model of the user's face, and to use this to generate the representation.

13. A method for generating one or more images for display, the method comprising:
- obtaining an image of a user's face while the user is engaged interactively with an application being executed to generate a virtual environment;
- identifying geometry information for the user's face using the obtained image;
- obtaining lighting information for the virtual environment;
- generating a representation of the user's face using the geometry information for the user's face and the obtained lighting information; and
- generating an output image comprising the generated representation of the user's face and an image of the virtual environment,
- wherein the generated representation is overlaid upon the image of the virtual environment at a predetermined location in the output image selected by the user.

14. A non-transitory machine-readable storage medium which stores computer software which, when executed by a computer, causes the computer to perform a method for generating one or more images for display, the method comprising:
- obtaining an image of a user's face while the user is engaged interactively with an application being executed to generate a virtual environment;
- identifying geometry information for the user's face using the obtained image;
- obtaining lighting information for the virtual environment;
- generating a representation of the user's face using the geometry information for the user's face and the obtained lighting information; and
- generating an output image comprising the generated representation of the user's face and an image of the virtual environment,
- wherein the generated representation is overlaid upon the image of the virtual environment at a predetermined location in the output image selected by the user.

* * * * *